United States Patent
Wang et al.

(10) Patent No.: US 7,681,841 B2
(45) Date of Patent: Mar. 23, 2010

(54) METHOD AND SYSTEM FOR SPACECRAFT POWER ACQUISITION USING SINGLE-AXIS SLIT SUN SENSOR

(75) Inventors: Hanching Grant Wang, Hacienda Heights, CA (US); Sadek W. Mansour, Torrance, CA (US); Douglas J. Bender, Redondo Beach, CA (US)

(73) Assignee: The Boeing Company, Chicago, IL (US)

( * ) Notice: Subject to any disclaimer, the term of this patent is extended or adjusted under 35 U.S.C. 154(b) by 531 days.

(21) Appl. No.: 11/608,140

(22) Filed: Dec. 7, 2006

(65) Prior Publication Data

US 2008/0135686 A1    Jun. 12, 2008

(51) Int. Cl.
    *B64G 1/36* (2006.01)
(52) U.S. Cl. ........................................ 244/171; 244/164
(58) Field of Classification Search .................. 244/171, 244/172.6, 172.7, 164, 158.1, 158.6
    See application file for complete search history.

(56) References Cited

U.S. PATENT DOCUMENTS

| | | | |
|---|---|---|---|
| 6,019,320 A * | 2/2000 | Shah et al. | 244/171 |
| 6,561,462 B1 * | 5/2003 | Wang et al. | 244/171 |
| 6,571,156 B1 | 5/2003 | Wang et al. | 701/13 |

* cited by examiner

*Primary Examiner*—Michael R Mansen
*Assistant Examiner*—Richard R Green
(74) *Attorney, Agent, or Firm*—Yee & Associates, P.C.; Kevin G. Fields

(57) ABSTRACT

A method for spacecraft power acquisition is provided using single-axis slit sun sensors for both wing-stowed and wing-deployed spacecraft configurations. The method for wing-deployed spacecraft includes initializing a solar wing of the spacecraft to search for sun; rotating the spacecraft about a search axis substantially parallel to a slit sun sensor field of view; monitoring the slit sun sensor for a time of arrival signal; and wherein, if the time of arrival signal occurs, the spacecraft is rotated along the search axis to an orientation where the time of arrival signal occurred and the spacecraft is placed in stable rotation about an axis substantially parallel to a solar wing longitudinal axis; and for a non-occurrence of the time of arrival signal, the spacecraft is slewed about a keyhole axis substantially perpendicular to the search axis to move the sun away from a keyhole.

18 Claims, 9 Drawing Sheets

METHOD AND SYSTEM FOR SPACECRAFT POWER ACQUISITION USING SINGLE-AXIS SLIT SUN SENSOR

BACKGROUND

1. Field of Disclosure

The disclosure generally relates to power acquisition for spacecraft and, more particularly, to power acquisition using a single-axis slit sun sensor.

2. Prior Art

Prior art spacecraft typically acquire the sun for power safety using sun sensor assemblies, for example, either wide field of view (WFOV) sun sensor, narrow field of view (NFOV) slit sun sensor, or multi-axis slit sun sensors. The use of a wide field of view sun sensor for sun acquisition requires a clear diamond field of view (FOV) about 120×120 degrees wide. As the size of certain components of the spacecraft, such as the antenna, the radiator and the solar wing with concentrator, is increased, it has become difficult for spacecraft to find such large clear FOV. In addition, the use of a wide field of view sun sensor for sun acquisition can involve angular measurement processing requiring expensive electronic hardware, such as buffer channel hardware and hardware for angular measurement processing. Furthermore, for prior art power acquisition methods using NFOV slit sun sensors or multi-axis slit sun sensors, at least two slit sun sensors, typically orthogonal to each other, are needed to sweep a wide area of the sky to find the sun.

There is a need for a simpler, more robust method for power acquisition for reaching power safety in spacecraft. There is also a need for a spacecraft power acquisition method that avoids the use of expensive hardware used by WFOV sun sensor acquisition and is less complicated than previous NFOV sun acquisition.

SUMMARY OF THE INVENTION

In one aspect of the disclosure, a method for spacecraft power acquisition is provided. The method includes initializing a solar wing of the spacecraft to search for sun; rotating the spacecraft about a search axis substantially parallel to a single-axis slit sun sensor field of view; and monitoring the slit sun sensor for a time of arrival signal; wherein, if the time of arrival signal occurs, the spacecraft is rotated along the search axis to an orientation where the time of arrival signal occurred and the spacecraft is placed in stable rotation about an axis substantially parallel to a solar wing longitudinal axis; and for a non-occurrence of the time of arrival signal, the spacecraft is slewed about a keyhole axis substantially perpendicular to the search axis to move the sun away from a keyhole.

In another aspect of the disclosure, a method for spacecraft power acquisition is provided. The method includes rotating the spacecraft about a search axis substantially parallel to a slit sun sensor field of view; monitoring the slit sun sensor for a time of arrival signal; wherein, if the time of arrival signal occurs, the spacecraft is rotated along the search axis to orient solar panels toward the sun and placed in stable spin about an axis substantially perpendicular to the search axis and the solar panels; and for a non-occurrence of the time of arrival signal, the spacecraft is stopped and then slewed about a keyhole axis substantially perpendicular to the search axis.

In yet another aspect of the disclosure, a spacecraft having a body reference frame with three mutually perpendicular axes, comprising a roll axis, a pitch axis, and a yaw axis, is provided. The spacecraft includes a solar wing having a plurality of solar panels; a single-axis slit sun sensor for providing a time of arrival signal; a set of gyros used to propagate attitude estimate; wherein the spacecraft performs a yaw search phase by rotating the spacecraft about the yaw axis; wherein if the sun is detected crossing a field of view of the single-axis slit sun sensor, the spacecraft goes to power safe spin; and wherein if the sun is not detected crossing a field of view of the single-axis slit sun sensor, the spacecraft is slewed to move the sun away from keyhole and then the yaw search is retried.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the disclosure will now be described with reference to the drawings of a preferred embodiment. The illustrated embodiment is intended to illustrate, but not to limit the invention. The drawings include the following.

DETAILED DESCRIPTION OF THE PREFERRED EMBODIMENTS

Figure 1:
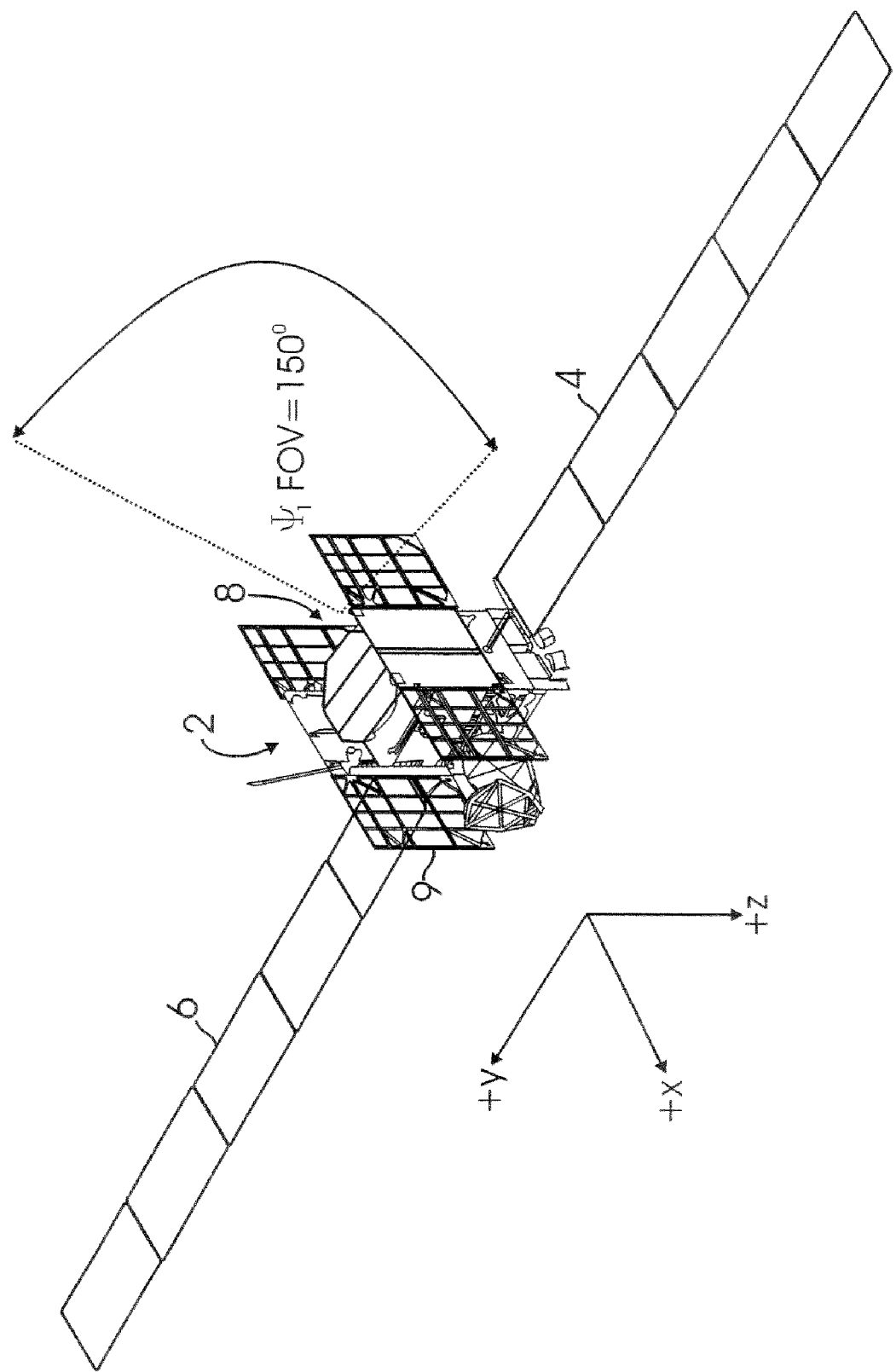
FIG. 1 shows a wing-deployed spacecraft having a single-axis slit sun sensor for power acquisitions, according to one aspect of the disclosure.

FIG. 1 shows a wing-deployed spacecraft 2 having a first solar wing 4 and a second solar wing 6. Each wing 4, 6 includes a plurality of solar panels for generating electrical power from solar power. Although five solar panels per wing are shown in FIG. 1, this is by way of example and each wing can have more or less solar panels. Spacecraft 2 also includes a single-axis slit sun sensor 8 (or $\Psi_1$) having a one-dimensional field of view (FOV) of 150°. The FOV of sun sensor 8 is in the xz plane (the sensor FOV plane) and the boresight is at the −x-axis. Radiators 9 radiate spacecraft generated heats into the space for temperature control. In addition, the spacecraft has a set of gyros (not shown) for propagating spacecraft attitude.

Figure 2:
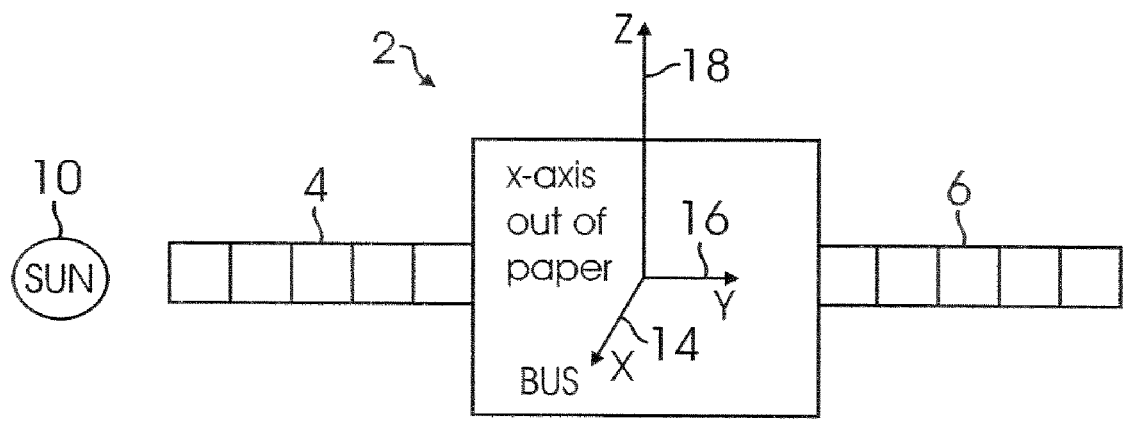
FIG. 2 is a schematic view of a wing-deployed spacecraft with the sun in the keyhole.
Figure 3:
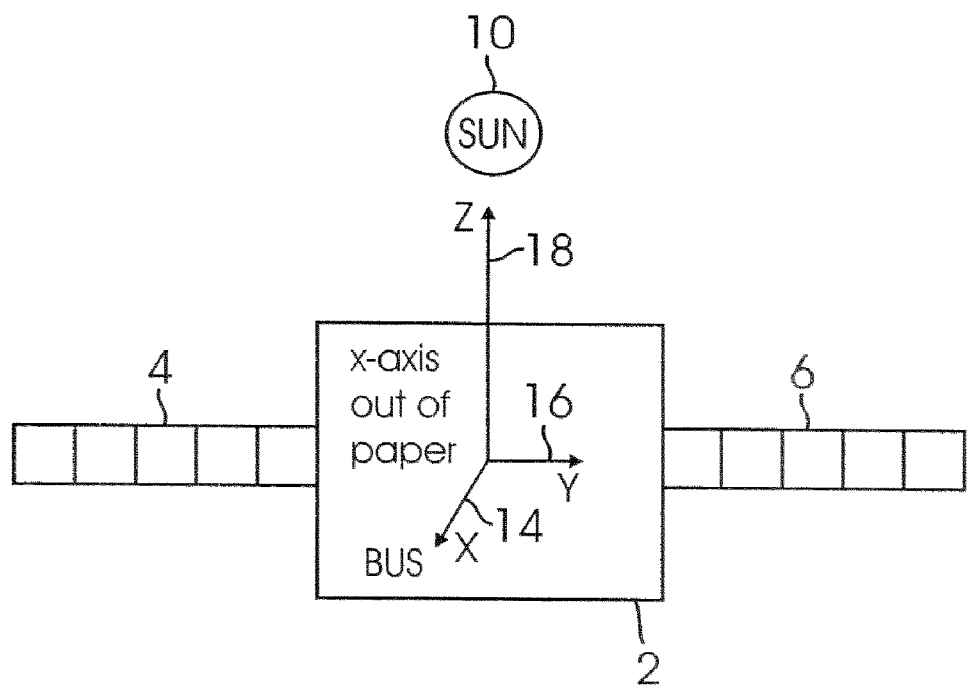
FIG. 3 is a schematic view of a wing-deployed spacecraft with the sun in the sensor FOV plane of a slit sun sensor.

FIGS. 2-3 are schematic views of geometrical relationships between the sun and a wing-deployed spacecraft. In FIG. 2, sun 10 is in the keyhole resulting in little or no power on solar wings 4, 6. In FIG. 3, sun 10 is in the sensor FOV plane, a plane that contains the sensor FOV of slit sensor 8. It should be noted that sun 10 is in xz plane, but not necessarily in FOV, as the FOV is only a sector of the xz plane. FIG. 3 shows sun 10 at +z, if FOV is 150°, sun 10 is not in FOV.

FIGS. 2-3 also show a 3-dimensional x-y-z reference frame, also referred to as "body" reference frame, comprising three mutually perpendicular axes, x-axis 14, y-axis 16, and z-axis 18. Unless indicated otherwise, as used herein the x-axis extends through or is parallel with the boresight of the spacecraft sun sensor, the y-axis extends through or is parallel with the spacecraft solar wings when they are in the deployed state, and the z-axis is perpendicular to the x-y plane. This orientation of the x-, y- and z-axes is illustrated in FIGS. 1-3. Each wing 4, 6 has a centerline or wing axis, which may be parallel or collinear with y-axis 16. Rotation of spacecraft 2 about x-axis 14 may be referred to as "roll", "roll-spin", or "x-spin", and x-axis 14 may be referred to as "roll axis". Rotation of spacecraft 2 about y-axis 16 may be referred to as "pitch", "pitch-spin", or "y-spin", and y-axis 16 may be referred to as the "pitch axis". Rotation of spacecraft 2 about z-axis 18 may be referred to as "yaw", "yaw-spin", or "z-spin", and z-axis 18 may be referred to as the "yaw axis".

The plane containing x-axis 14 and y-axis 16 is referred to as the "xy plane"; the plane containing y-axis 16 and z-axis 18 is referred to as the "yz plane"; and, the plane containing x-axis 14 and z-axis 18 is referred to as the "xz plane". An axis about which spacecraft 2 is rotating, or spinning, may be referred to as the "spin axis"; for example, if spacecraft 2 is undergoing x-spin, then x-axis 14 may be referred to as the spin axis. "Polar angle" refers to an angle, in any plane containing the spin axis and the sun line, measured with respect to the spin axis. The sun line is the directional unit vector from the spacecraft center to the sun.

FIG. 2 shows wing-deployed spacecraft 2 in the "paddle wheel" scenario, in which spacecraft 2 is rotating, or spinning, about z-axis 18. The paddle wheel scenario is the worst case scenario for solar power reception from the sun by solar wings 4, 6, and is characterized by the spin axis of spacecraft 2, in the xz plane, being perpendicular to the sun line. As illustrated by the example paddle wheel scenario shown in FIG. 2, the spin axis of spacecraft 2 may be z-axis 18, which is perpendicular to the sun line from spacecraft 2 to sun 10. Thus solar wings 4, 6 resemble paddles of a paddle wheel, paddling through the sun, twice for each revolution of spacecraft 2 about z-axis 18. When sun 10 is approximately aligned with the wing axis of wings 4, 6 (y axis 16), as seen in FIG. 2, sun 10 is referred to as being in "keyhole", and a keyhole scenario is one in which spacecraft 2 orientation places sun 10 approximately in keyhole.

FIG. 3 shows spacecraft 2 in power safe configuration, in which spacecraft 2 is spinning about y axis 16: In power safe configuration, solar power reception from sun 10 by solar wings 4, 6 is adequate to ensure power, thermal, and momentum safety for spacecraft 2. Power safe configuration may be characterized by the wing axis of wings 4, 6 being near perpendicular to the sun line. As illustrated by the example shown in FIG. 3, the spin axis of spacecraft 2 is y-axis 16, which is also the wing axis of wings 4, 6, and is perpendicular to the sun line from spacecraft 2 to sun 10. Thus, as seen in FIG. 3, in power safe configuration sun 10 may be close to the xz plane; the sun line may be near perpendicular to the wing axis, i.e., y-axis 16; and the sun polar angle, between the sun line and y-axis 16, i.e. the spin axis, may be close to 90 degrees during y-spin of spacecraft 2

The fundamental geometry observation relevant to the disclosure is that by rotating spacecraft 2 about an axis in or close to the xz plane, i.e., an axis nearly perpendicular to the wing axis (y-axis 16), spacecraft 2 can be rotated such that sun 10 is in or close to the xz plane. The sun line, therefore, is nearly perpendicular to the wing axis of rotation (y-axis 16), and each wing 4, 6 will receive high solar power. The detection of whether the sun is in or close to the xz plane is by a time-of-arrival of a single-axis slit sun sensor on the xz plane.

Figure 4B:
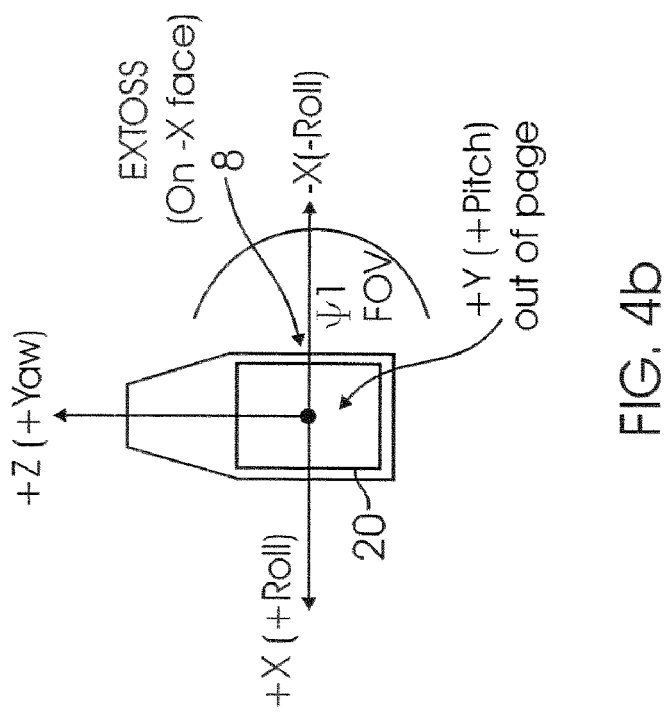
FIGS. 4a-4b show a wing-stowed spacecraft having a single-axis slit sun sensor for power acquisitions, according to one aspect of the disclosure.
Figure 4A:
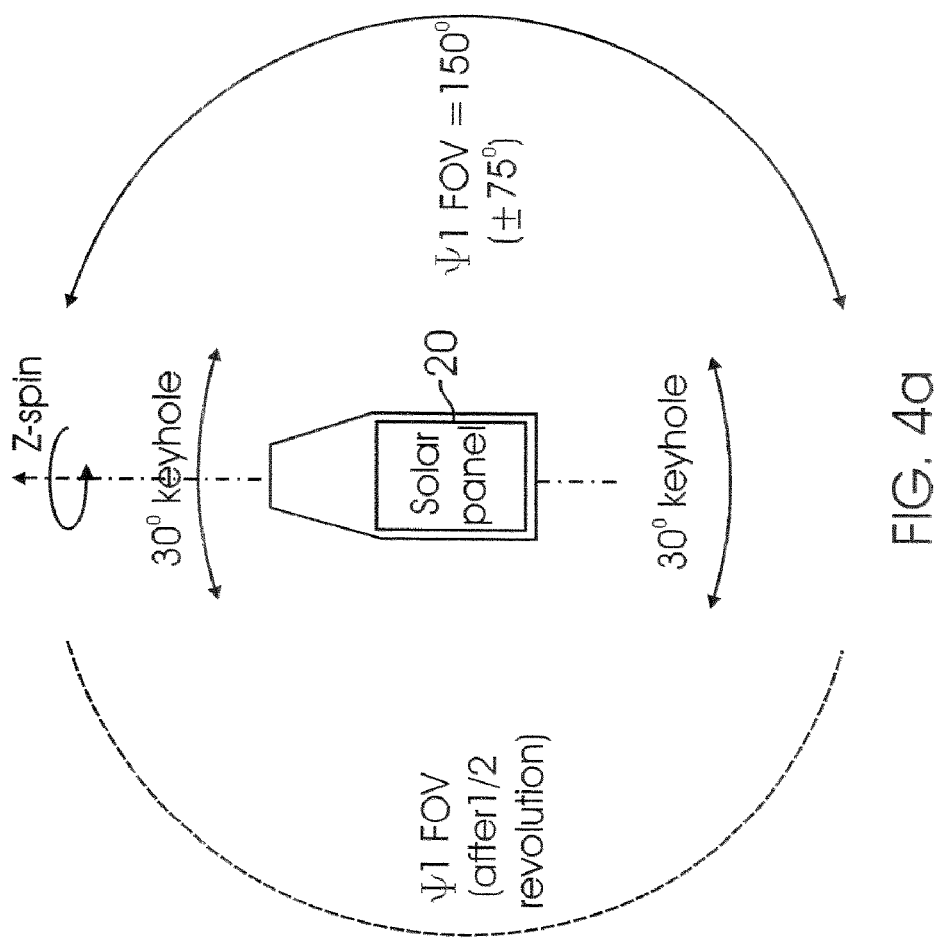

FIGS. 4a-4b show a solar panel 20 of a wing-stowed spacecraft 2 in the 3-dimensional x-y-z reference frame. Rotating spacecraft 2 equipped with a slit sun sensor 8, with a FOV of 150°, along the positive Z-axis (vertical axis), the sensor FOV sweep volume will not cover the entire sky, as there is a 30° cone (or keyhole) in the vertical axis, in both the up and down directions, that slit sun sensor 8 cannot view. If slit sun sensor 8 is rotated, by rotating spacecraft 2, along vertical axis for a complete revolution and slit sensor 8 fails to detect sun 10, sun 10 is located in the 30° degree keyhole, either in the up or down direction. Upon detection of sun 10, an attitude estimate is reset, for example 0°, allowing gyros on spacecraft 2 to continue to measure and propagate the attitude estimate. For example, if slit sun sensor is rotated another 90°, the gyros can measure the attitude.

Figure 5:
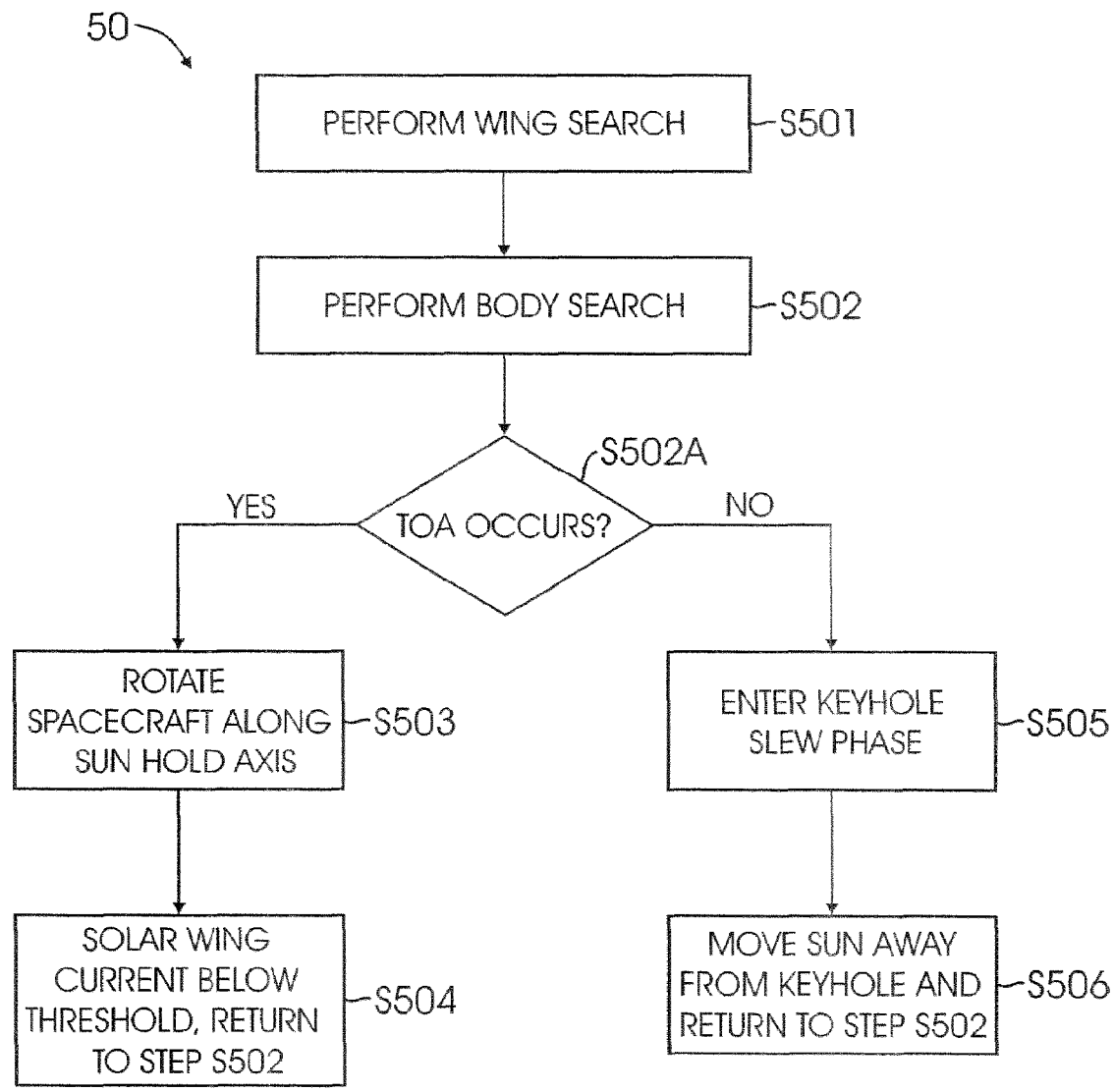
FIG. 5 is a flow chart illustrating the steps of spacecraft power acquisition for a wing-deployed spacecraft, according to one aspect of the disclosure.

FIG. 5 is a flow chart illustrating the steps of spacecraft power acquisition for a wing-deployed spacecraft, according to one aspect of the disclosure. The initial state of a wing-deployed spacecraft prior to execution of method 50, for example, is that spacecraft is in nominal on-station operations or in wing-deployed transfer orbit operations. An example of wing-deployed transfer orbit operations is a transfer orbit operation using electrical propulsion (e.g., Xenon Ion engine or Hall Effect engine, Arcjet, electro-thermo jet, dielectro-thermo jet) wherein the engine requires a large amount of electrical power and therefore the solar wing has to be deployed to provide the power. Power acquisition is commanded as part of the response to an on-board anomaly. The final state of spacecraft after execution of method 50, for example, is that spacecraft may be in y-spin with sun polar angle near 90 degrees. The peak solar wing current is continuously monitored.

In step S501, a wing sun search phase is initiated to place spacecraft 2 in a known state suitable for power acquisition. In the wing sun search phase, the solar wing continuously searches for the sun to face toward the sun for maximum solar power reception and a solar wing current is monitored against a low current threshold. Various prior art methods for solar wing sun search are known for those skilled in the art and therefore not elaborated here. In step S502, a body search phase begins. Spacecraft is rotated about or along a search axis parallel to (or in the same plane as) the sun sensor FOV plane and perpendicular to the sensor boresight (z-axis 18 for a sensor FOV plane in xz plane and a sensor boresight at −x axis in one aspect of the disclosure).

In step S502A, spacecraft is monitored for a time of arrival (TOA) from a single-axis slit sun sensor. In step S503, a TOA occurs, i.e. sun 10 crosses the xz plane at that instant (sun crosses the senor FOV in xz plane), the attitude estimate is reset to identity and attitude command is also reset to identity to place sun 10 in xz plane. The sun will be in xz plane after settling as spacecraft is rotated along the search axis to the orientation where the TOA occurred. Spacecraft 2 is then placed in stable rotation at a desired rate about an axis, i.e. sun hold axis (y axis is the sun hold axis in this example), substantially parallel to the solar wing longitudinal axis, and solar wing current is checked to be at least over the safety threshold. The sun polar angle relative to spin axis is held close to 90°. In step S504, solar wing current over a spin period is monitored and if the current is below safety threshold, the process returns to body search phase in step S502.

If in step S502A, no TOA occurs after a complete revolution, the keyhole slew phase in step S505 is begun. In the keyhole slew phase, the z-rotation of spacecraft is stopped and the y-spin is immediately established at the desired rate in any direction for a predetermined angle based on the slit sun sensor FOV and potential control error. In step S506, gyros are used to move sun 10 away from keyhole and then the process proceeds back to the body search phase, in step S502.

Figure 6:
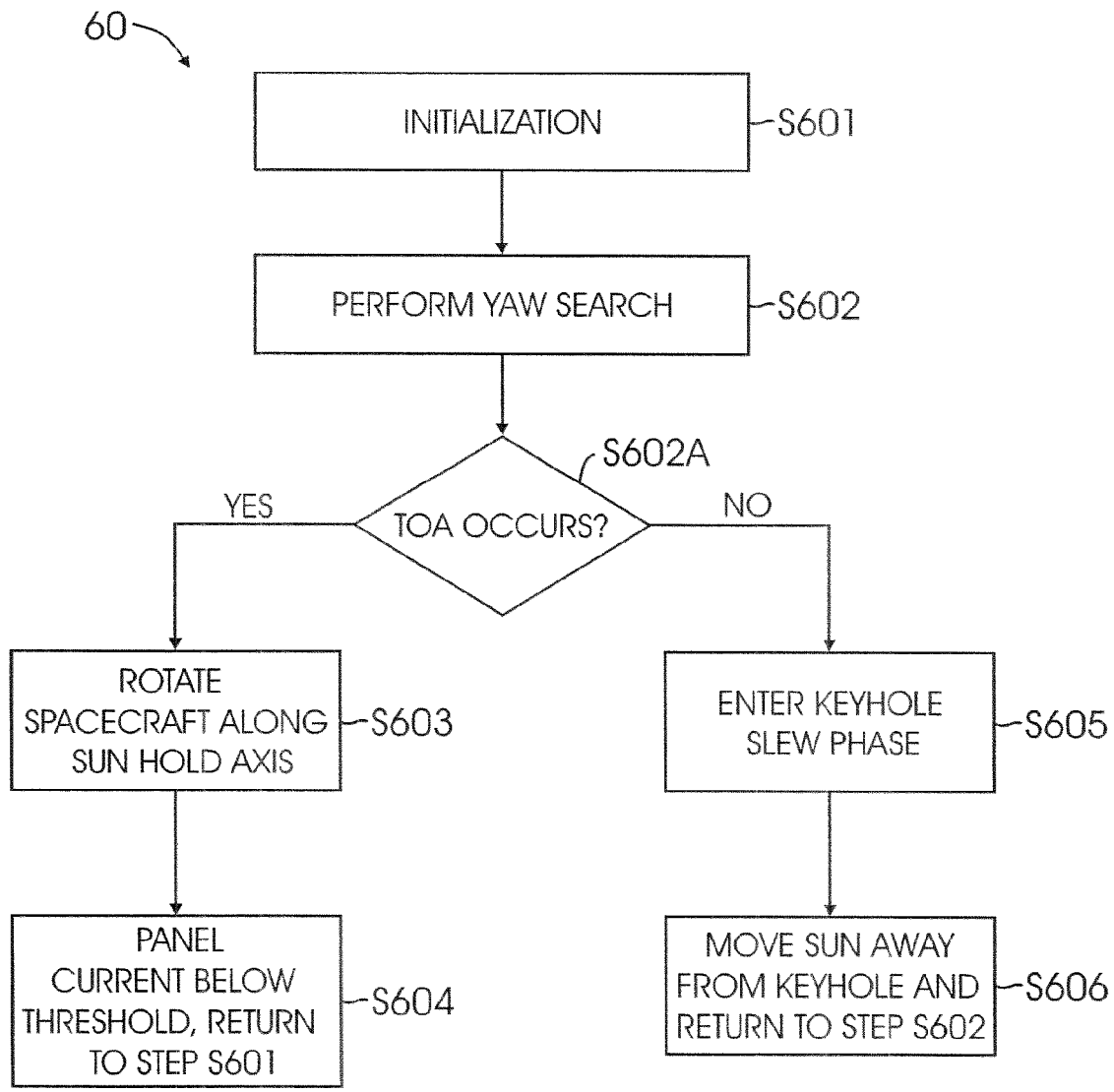
FIG. 6 is a flow chart illustrating the steps of spacecraft power acquisition for a wing-stowed spacecraft in transfer orbit according to one aspect of the disclosure.

FIG. 6 is a flow chart illustrating the steps of spacecraft power acquisition for a wing-stowed spacecraft in transfer orbit, according to one aspect of the disclosure. The initial state of a wing-stowed spacecraft prior to execution of method 60, for example, is that spacecraft may be in arbitrary attitude and momentum states under wing-stowed configuration in bi-propellant transfer orbit. Power acquisition is commanded as part of the response to an on-board anomaly. The final state of spacecraft after execution of method 60, for example, is that spacecraft may be in x-spin with sun polar angle near 90 degrees. The peak panel current is continuously monitored.

In step S601, an initialization phase is performed in which spacecraft 2 is placed in a known state suitable for power acquisition. In step S602, a yaw search phase is performed by rotating spacecraft 2 along yaw axis. i.e., z-axis 18, to bring sun 10 to the xz plane closer to the −x axis. Spacecraft is monitored for a TOA from a single-axis slit sun sensor. If a TOA occurs, the attitude estimate is reset to identity and the attitude command is reset to z-rotate additional 90° (without stopping) and then the process proceeds to sun hold phase in step S603. The sun will be in yz plane after settling. The 90° of additional rotation is the separation angle between the sensor FOV plane (xz plane) and the solar panel plane (yz plane), so that after the rotation, the sun will be in the solar panel plane.

In the sun hold phase, spacecraft 2 will start the x-spin at a desired rate and panel peak current is checked to be at least over the safety threshold. (The x-axis in this example is the sun hold axis, the spin axis in sun hold phase. The sun hold axis is typically perpendicular to the solar panel and the search axis.) The sun polar angle to spin axis is held close to 90°. Peak panel current over a spin period is monitored and if the current is below safety threshold, the process returns to initialization phase in steps S601.

If in step S602A, if no TOA occurs after a complete revolution the keyhole slew phase in step S605 is begun. In the keyhole slew phase (or pitch search phase), spacecraft 2 is stopped, slewed for a predetermined angle about a keyhole axis perpendicular to the search axis. In step S606, gyros are used to move sun 10 away from keyhole and then the process proceeds back to the yaw search phase, in step S602.

Figure 7:
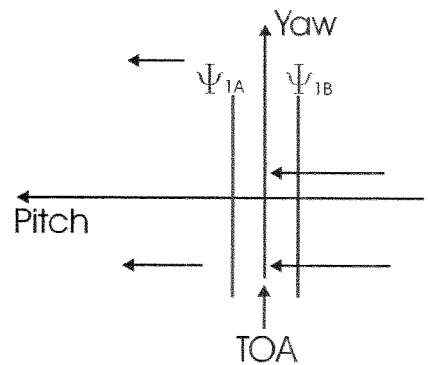
FIG. 7 is a graph showing the sun trajectory relative to a slit sun sensor FOV during the yaw search phase, according to one aspect of the disclosure.

FIG. 7 is a graph showing the sun trajectory relative to a single-axis slit sun sensor FOV during yaw search phase, according to one aspect of the disclosure. Sun sensor 8 has $\Psi_{1A}$ and $\Psi_{1B}$ for dual redundancy in the event one fails; the other can continue to function.

Figure 8A:
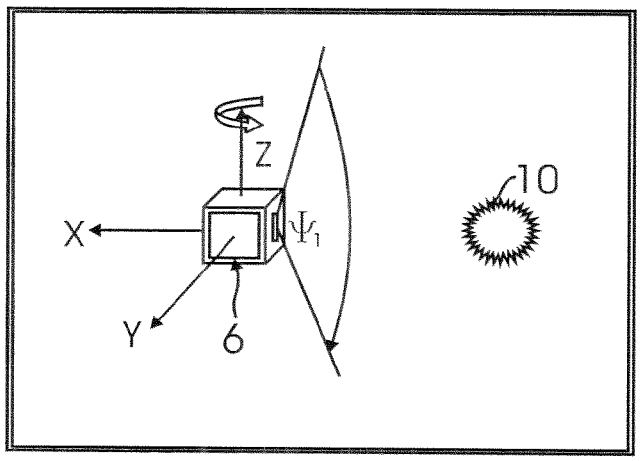
FIGS. 8a-8b show the sun initially inside the sweep volume of the field of view of the slit sun sensor, according to one aspect of the disclosure.
Figure 8B:
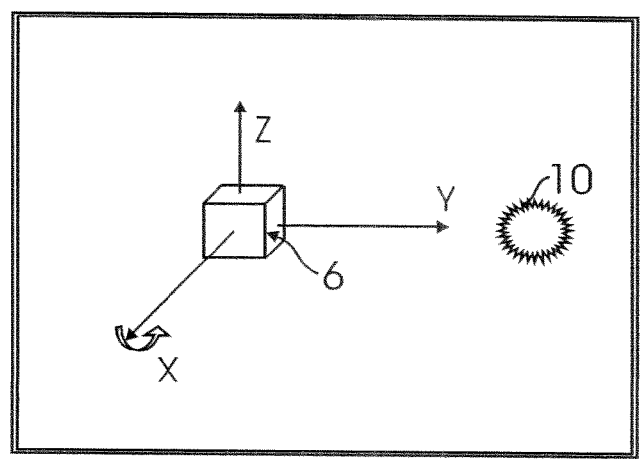

FIGS. 8a-8b show an example of sun 10 initially inside the sweep volume of the field of view of slit sun sensor 8, according to one aspect of the disclosure. Spacecraft 2 is spinning about z-axis (wing-stowed spacecraft configuration) with sun 10 initially in xy plane. An emergency power acquisition is commanded as spacecraft 2 has lost solar power. Slit sun sensor detects sun 10 in the xz plane the attitude estimate is reset to identity and attitude command is reset to 90°. Spacecraft 2 is then commanded to spin about the x-axis to achieve power safety (see FIG. 8b).

Figure 9:
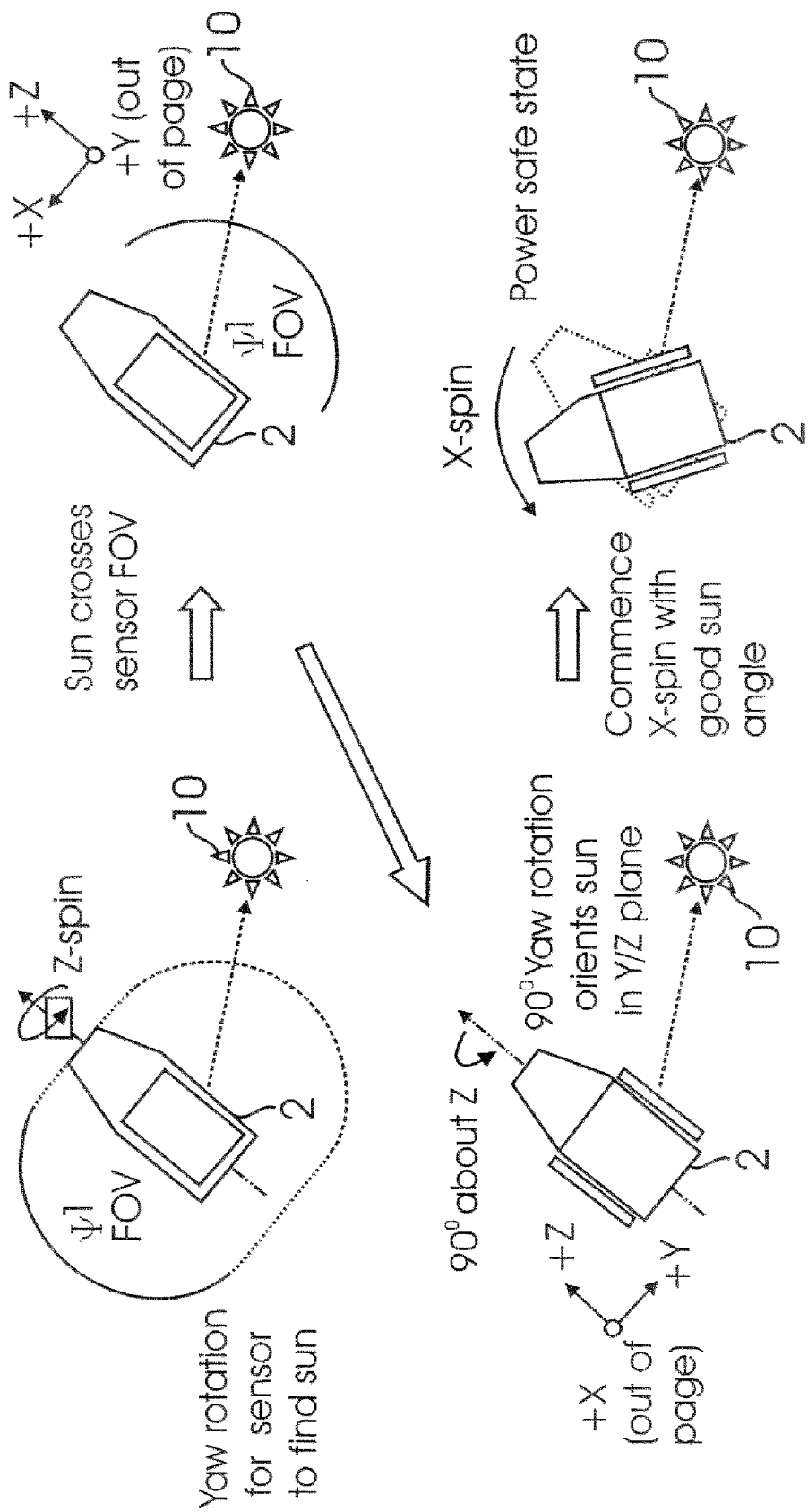
FIG. 9 shows the sequence of spacecraft power acquisition with one single-axis slit sun sensor with the sun initially inside the sweep volume of the field of view of the slit sun sensor.

FIG. 9 shows the sequence of spacecraft power acquisition with a single-axis slit sun sensor with sun 10 initially inside the sweep volume of the field of view of slit sun sensor 8. Spacecraft 2 is spinning about z-axis so sun sensor can detect sun 10 crossing the sensor FOV. When sun 10 is detected crossing the FOV of sensor, slew is continued for additional 90° along z-axis to orient sun in yz plane and then spacecraft 2 is rotated about x-axis (sun hold axis) putting spacecraft 2 in a power safe state.

Figure 10A:
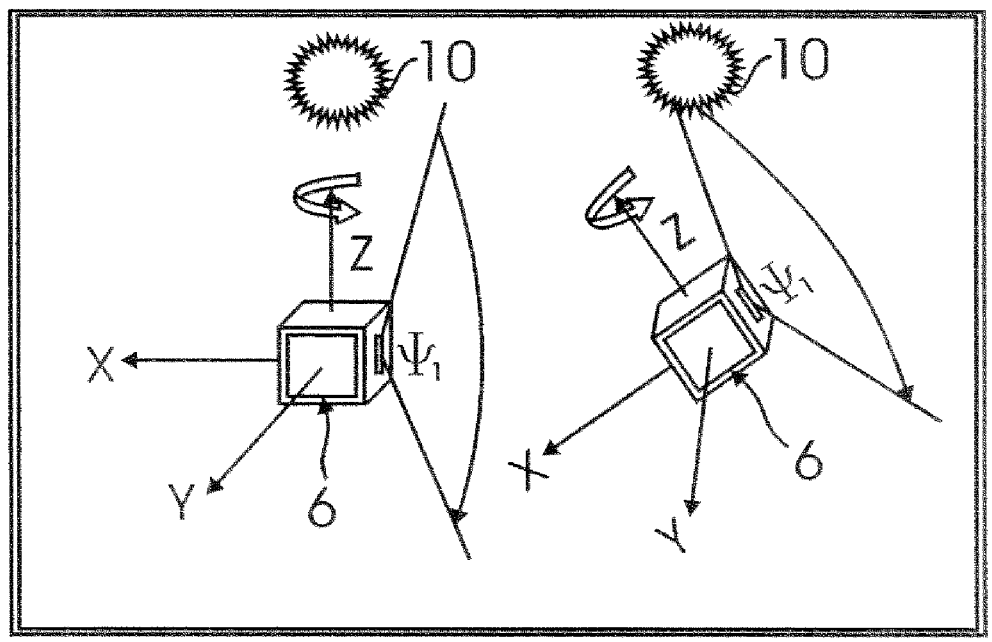
FIGS. 10a-10b show the sun initially in the keyhole (outside of the sweep volume of the field of view of the slit sun sensor), according to one aspect of the disclosure.
Figure 10B:
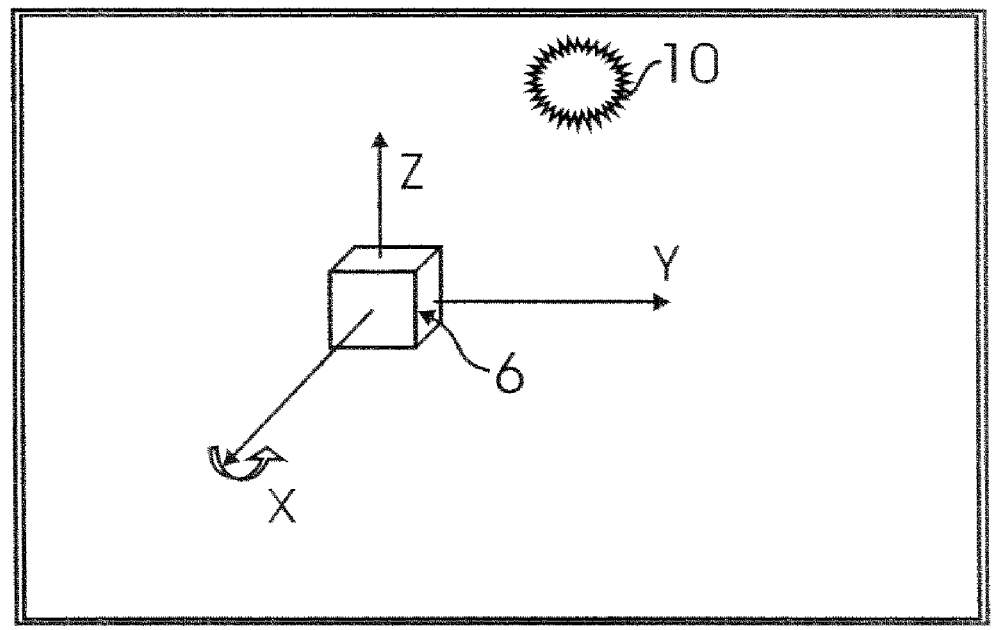

FIGS. 10a-10b show an example of sun 10 initially in the keyhole, according to one aspect of the disclosure. Spacecraft 2 is spinning about z-axis (wing-stowed spacecraft configuration) with sun 10 near z-axis. An emergency power acquisition is commanded as spacecraft has lost solar power. A yaw search does not find sun 10 in first attempt since sun 10 is initially outside the sweep volume of the sensor FOV, so spacecraft 2 is commanded to slew 30° about y-axis (keyhole slew) to move sun 10 away from keyhole. A yaw search is commanded again and slit sun sensor 8 detects sun 10 in the xz plane and the attitude estimate is reset to identity and attitude command is reset to 90°. Sun 10 will settle at yz plane to have solar power on solar panel (see FIG. 10b). Spacecraft 9 is then commanded to spin about the x-axis to achieve continuous power safety.

Figure 11:
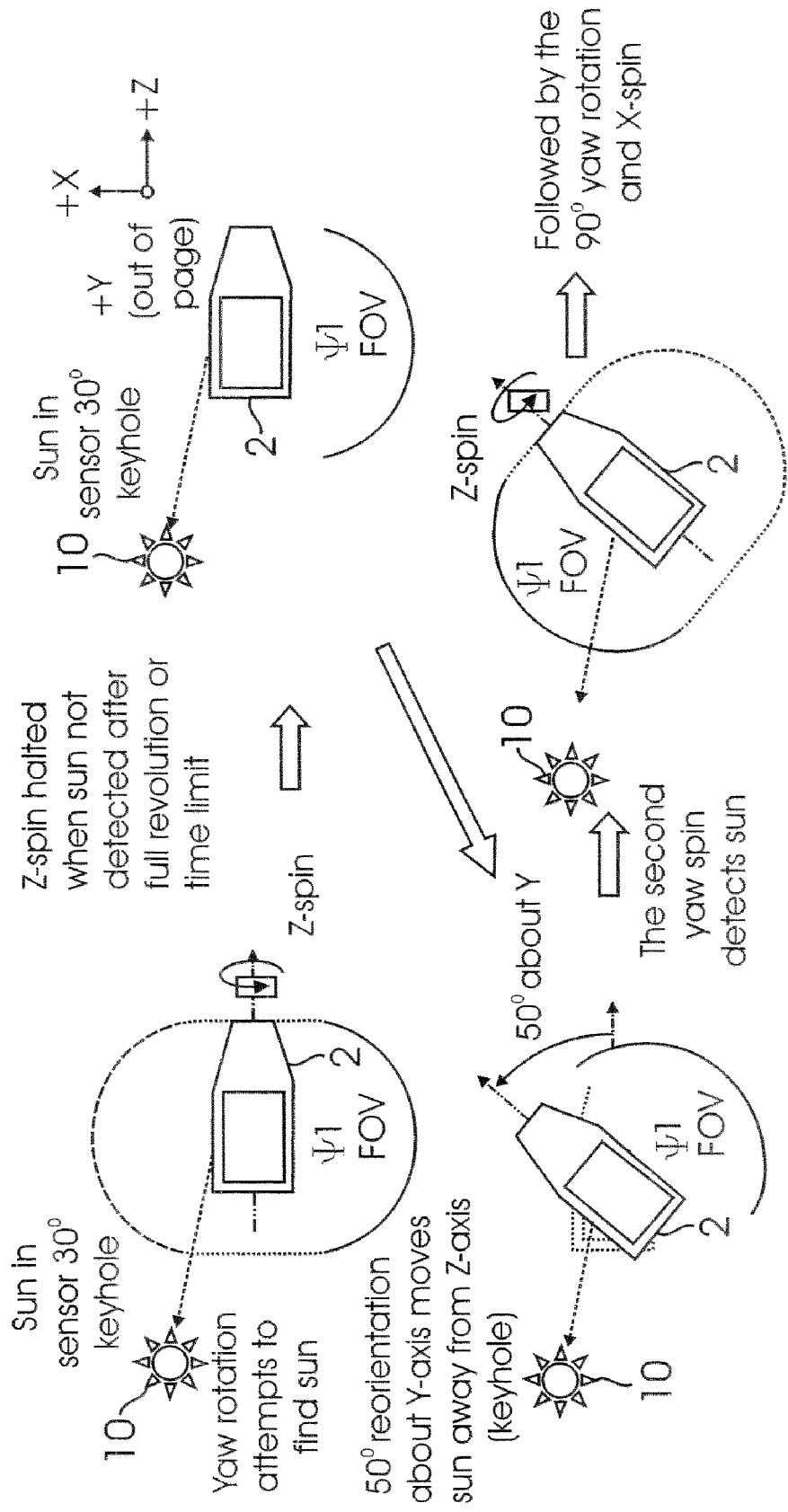
FIG. 11 shows the sequence of spacecraft power acquisition with one single-axis slit sun sensor with the sun initially in the keyhole (outside of the sweep volume of the field of view of the slit sun sensor).

FIG. 11 shows the sequence of spacecraft power acquisition with a single-axis slit sun sensor with sun 10 initially in the keyhole. Spacecraft 2 is spinning about z-axis so that sun sensor can find sun 10. If after a complete rotation, sun 10 is not found, z-spin is halted as sun 10 is located in the 30° keyhole, either in the up or down direction. A 50° reorientation about y-axis moves sun 10 away from z-axis (keyhole). The keyhole reorientation angle determined by the size of sensor FOV and potential control error is selected to ensure the sun will be moved away from the keyhole. The second yaw spin detects sun 10. When sun 10 crosses the FOV of slit sun sensor 8, spacecraft 2 is rotated an additional 90° along the yaw axis to orient sun in yz plane and then spacecraft 2 is rotated about the x-axis with good sun polar angle and in power safe state.

Although the disclosure is described with a FOV of 150° in the xz plane this is by way of example only and varies sizes of FOV and various FOV orientations can be utilized. Although the disclosure only requires a single-axis slit sun sensor, the method is applicable to a multi-axis slit sun sensor used as a single-axis slit sun sensor or a failed multi-axis slit sun sensor with only one axis functioning. The single-axis slit sun sensor FOV can be composed from two segments that are not collocated to avoid physical FOV blockage. For example, the single-axis slit sun sensor can have two segments installed in two different locations for clear segment FOV (e.g., "+y" half segment in x/z plane, the other "−y" half rotated 45° about z-axis), and the two segments are combined in software to form the total FOV.

In summary, the disclosure uses only a single-axis slit sun sensor reducing the necessary hardware over prior art spacecraft. Additionally, the disclosure only requires three phases to acquire power whereas the prior art spacecraft require five to eight phases, and a yaw slew is performed first in the disclosure as opposed to pitch slew first in prior art methods, resulting in improved time to power safety performance.

While the disclosure is described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A method for power acquisition, the method comprising:
   a) in a spacecraft having a solar wing and a sun sensing apparatus consisting of a single-axis slit sun sensor having a boresight, executing a wing sun search phase in which the solar wing continuously searches for the sun to face toward the sun for strong solar power reception and a solar wing current is monitored against a low current threshold;
   b) executing a body search phase in which the spacecraft rotates about a search axis that is substantially parallel to or in the same plane as the field of view plane of the single-axis slit sun sensor and perpendicular to the boresight of the single-axis slit sun sensor;
   c) monitoring the single-axis slit sun sensor for a time of arrival (TOA) signal;
   d) if the TOA signal occurs, rotating the spacecraft along the search axis to an orientation where the TOA signal occurred and placing the spacecraft in stable rotation about an axis coincident with or substantially parallel to a solar wing longitudinal axis; and
   e) if the TOA signal does not occur, executing a keyhole slew phase in which rotation of the spacecraft about the search axis is halted and the spacecraft is rotated about a keyhole axis coincident with or substantially parallel to the solar wing longitudinal axis through a predetermined angle based on the field of view of the single-axis slit sun sensor and a potential control error to move the sun away from a keyhole, and repeating steps b), c) and d);
   wherein the steps are performed in the order a)-b)-c)-d) or a)-b)-c)-e).

2. The method of claim 1, wherein the initial state of the spacecraft is in nominal on-station operations.

3. The method of claim 1, wherein initially the spacecraft is in a wing-deployed transfer orbit.

4. The method of claim 1, wherein in a final state of the spacecraft a sun polar angle for the spacecraft is at or near 90°.

5. The method of claim 1, further comprising monitoring peak panel current over a spin period to determine if the current is below a safety threshold.

6. The method of claim 1, further comprising stopping rotation of the spacecraft in the orientation where the TOA signal occurred and resetting the spacecraft's attitude estimate and attitude command to identity to remember the orientation.

7. The method of claim 6, wherein when the spacecraft is in the orientation where the TOA signal occurred the sun is in a plane that is substantially perpendicular to the solar wing longitudinal axis.

8. The method of claim 1, wherein no steps are performed in addition to a), b), c), d) or e).

9. A method for power acquisition, the method comprising:
   a) in a spacecraft having a solar wing in a stowed state and a sun sensing apparatus, the sun sensing apparatus consisting of a single-axis slit sun sensor having a boresight, wherein an x-axis extends through or is parallel with the boresight, a y-axis extends through or is parallel with the spacecraft solar wing when it is in a deployed state, and a z-axis is perpendicular to the x-y plane, executing a yaw search phase in which the spacecraft rotates about the z-axis;
   b) monitoring the single-axis slit sun sensor for a time of arrival (TOA) signal at which the sun lies in the plane defined by the single-axis slit sun sensor's field of view;
   c) if the TOA signal occurs, resetting the spacecraft's attitude estimate and attitude command to identity at the orientation where the TOA signal occurred, rotating the spacecraft an additional ninety degrees about the z-axis from the orientation where the TOA signal occurred to orient the solar wing toward the sun, halting rotation about the z-axis and rotating the spacecraft about the x-axis; and
   d) if the TOA signal does not occur, executing a keyhole slew phase in which rotation of the spacecraft about the z-axis is halted and the spacecraft rotates about the y-axis through a predetermined angle based on the single-axis slit sun sensor field of view and a potential control error to move the sun away from a keyhole, and repeating steps a), b) and c);
   wherein the steps are performed in the order a)-b)-c) or a)-b)-d).

10. The method of claim 9, wherein initially the spacecraft is in arbitrary attitude.

11. The method of claim 9, wherein in a final state of the spacecraft a sun polar angle for the spacecraft is at or near 90 degrees.

12. The method of claim 9, further comprising monitoring peak panel current over a spin period to determine if the current is below a safety threshold.

13. The method of claim 9, wherein no steps are performed in addition to a), b), c) or d).

14. A spacecraft having a body reference frame with three mutually perpendicular axes, said spacecraft comprising:
   a solar wing having a plurality of solar panels;
   a sun sensing apparatus consisting of a single-axis slit sun sensor for providing a time of arrival (TOA) signal, the sun sensor having a boresight; and
   a set of gyros used to propagate attitude estimate;
   wherein the three mutually perpendicular axes comprise a roll axis extending through or parallel with the boresight, a pitch axis extending through or parallel with the spacecraft solar wing when it is in a deployed state, and a yaw axis perpendicular to a plane defined by the roll axis and the pitch axis;
   wherein the spacecraft is configured to perform a yaw search phase in which the spacecraft rotates about the yaw axis and the single-axis slit sun sensor is monitored for a TOA signal at which the sun lies in the plane defined by the single-axis slit sun sensor's field of view;
   wherein if the sun is detected crossing the single-axis slit sun sensor's field of view the spacecraft's attitude estimate and attitude command are reset to identity and the spacecraft rotates an additional ninety degrees about the yaw axis to orient the solar wing toward the sun, and the spacecraft rotates about the roll axis; and
   if the sun is not detected crossing the single-axis slit sun sensor's field of view, the spacecraft executes a keyhole slew phase in which rotation of the spacecraft about the yaw axis is halted and the spacecraft is rotated about the pitch axis through a predetermined angle based on the single-axis slit sun sensor field of view and a potential control error to move the sun away from a keyhole.

15. The spacecraft of claim 14, wherein initially the spacecraft is in an arbitrary attitude.

16. The spacecraft of claim 15, wherein in a final state of the spacecraft a sun polar angle for the spacecraft is at or near 90°.

17. The spacecraft of claim 14, wherein initially the spacecraft is in nominal on-station operations.

18. The spacecraft of claim 14, wherein initially the spacecraft is in a wing-deployed transfer orbit.

* * * * *